US00RE40262E

(19) United States
(12) Reissued Patent
Holmes et al.

(10) Patent Number: US RE40,262 E
(45) Date of Reissued Patent: Apr. 29, 2008

(54) METHOD TO INFER ENGINE COOLANT TEMPERATURE IN CYLINDER HEAD TEMPERATURE SENSOR EQUIPPED VEHICLES

(75) Inventors: John William Holmes, Eastpointe, MI (US); Randy Adam Betki, Grosse Ile, MI (US); Michael John Cullen, Northville, MI (US)

(73) Assignee: Ford Global Technologies, LLC, Dearborn, MI (US)

(21) Appl. No.: 09/835,926

(22) Filed: Apr. 16, 2001

Related U.S. Patent Documents

Reissue of:
(64) Patent No.: 6,026,679
Issued: Feb. 22, 2000
Appl. No.: 09/037,508
Filed: Mar. 10, 1998

(51) Int. Cl.
*G01M 15/00* (2006.01)

(52) U.S. Cl. ..... 73/117.3; 73/116; 374/145; 340/449; 123/41.15

(58) Field of Classification Search ..... 73/116, 73/117.2, 117.3, 118.1, 119 R; 123/41.15; 340/449; 374/145
See application file for complete search history.

(56) References Cited

U.S. PATENT DOCUMENTS

| | | | | | |
|---|---|---|---|---|---|
| 4,393,365 | A | * | 7/1983 | Kondo et al. | 340/449 |
| 4,984,454 | A | * | 1/1991 | Feller et al. | 73/117.3 |
| 5,020,007 | A | * | 5/1991 | Wu et al. | 702/34 |
| 5,201,840 | A | * | 4/1993 | Sausner et al. | 374/145 |
| 5,669,337 | A | * | 9/1997 | Drouillard | 123/41.15 |
| 5,931,140 | A | * | 8/1999 | Maloney | 123/480 |

* cited by examiner

*Primary Examiner*—Eric S. McCall

(57) ABSTRACT

The present invention provides a method of inferring the engine coolant temperature in cylinder head temperature sensor equipped vehicles including the steps of measuring the cylinder head temperature, calculating the engine coolant temperature from the measured cylinder head temperature as a function of at least one vehicle operational state, generating a signal for the calculated engine coolant temperature, and sending the generated signal to a display.

25 Claims, 2 Drawing Sheets

METHOD TO INFER ENGINE COOLANT TEMPERATURE IN CYLINDER HEAD TEMPERATURE SENSOR EQUIPPED VEHICLES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to an automotive engine coolant temperature determination method. More particularly, the present invention relates to a method using a cylinder head temperature sensor to infer such a temperature.

2. Disclosure Information

It is well known that malfunctions of engine cooling systems, such as a leak, will generally cause damage to the engine due to excessive engine overheating. To indicate such an event, a temperature sensing system for an internal combustion engine may include an engine coolant temperature (ECT) sensor, a cylinder head temperature (CHT) sensor, or a combination of the two. The temperature sensors record a temperature and relay the information to an electronic engine controller, which, in turn, relays the information to an operator, typically via an instrument display panel.

In ECT sensor equipped vehicles the sensor typically communicates with a coolant passage in a cylinder head. The problem with ECT sensor equipped vehicles is that an accurate reading of the CHT can not be obtained. Having an accurate CHT reading is important with respect to fuel economy and emissions.

In CHT sensor equipped vehicles the sensor typically communicates with the cylinder head at a location adjacent the combustion chamber of the engine. A problem with CHT sensor equipped vehicles is that the ECT can not be accurately calculated. For example, the CHT can be up to 70 degrees Fahrenheit hotter than the ECT and the temperature gauge would read hot when the system is really operating within a normal temperature range, thereby giving a "false reading".

To combat these problems many vehicles are equipped with both ECT and CHT sensors. A problem with a two sensor system is that it is more costly than the single sensor systems. A further problem is that the algorithm programmed into the engine controller is more complex because of the need to receive information from two sensors.

It would therefore be desirable to provide a method of accurately inferring ECT in CHT sensor equipped vehicles that overcomes the deficiencies associated with previous systems.

SUMMARY OF THE INVENTION

The present invention overcomes the disadvantages of the prior art approaches by providing a method of inferring ECT in CHT sensor equipped vehicles including the steps of measuring the CHT, calculating the ECT from the measured CHT as a function of at least one vehicle operational state, generating a signal for the calculated ECT, and sending the generated signal to a display.

It is an object and advantage of the present invention to calculate ECT as a function of the vehicle operational state. Calculation in this fashion prevents "false readings" which may arise when CHT is running hotter then ECT, but still within an acceptable operational range.

A feature of the present invention is to filter the calculated ECT to prevent inaccurate display readings resulting from sudden changes in vehicle operational states, the filter step being performed prior to the step of generating a signal.

These and other advantages, features and objects of he invention will become apparent from the drawings, detailed description and claims which follow.

DETAILED DESCRIPTION OF THE PREFERRED EMBODIMENTS

Figure 1:
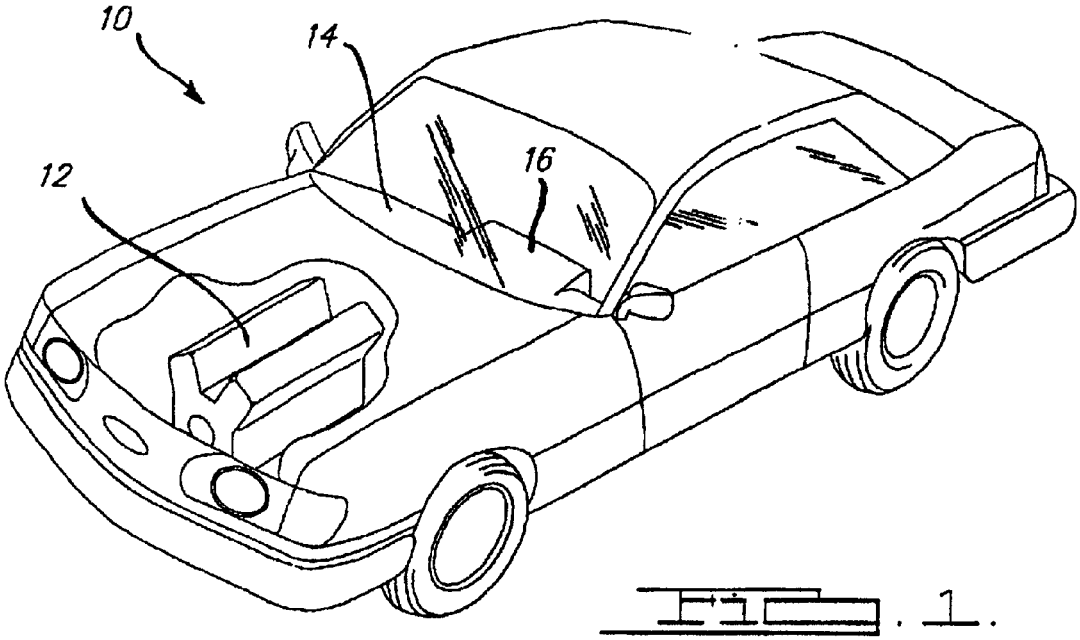
FIG. 1 is a perspective view of an automotive vehicle according to the present invention.

Referring now to the drawings, FIG. 1 shows an automotive vehicle 10 having an internal combustion engine 12 and a dashboard 14 housing an instrument display panel 16. As known in the art, the display panel 16 has a variety of gauges which communicate various vehicle operational states such as vehicle speed, engine revolutions per minute, and engine temperature for example.

Figure 2:
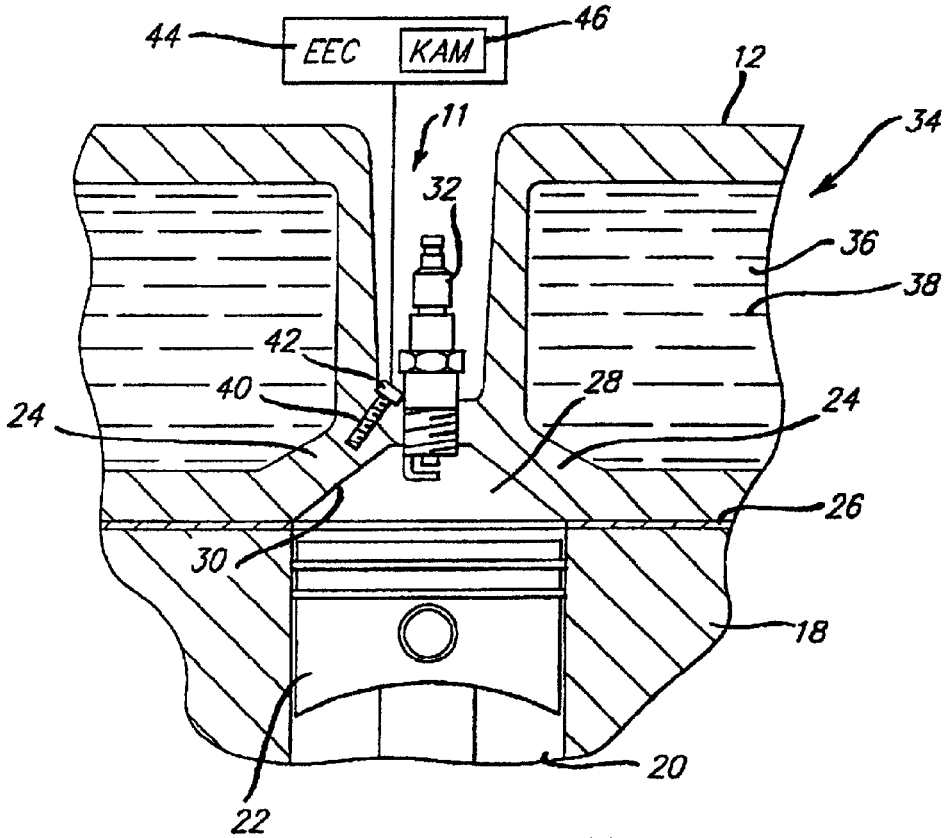
FIG. 2 is a partial cross-sectional view of an internal combustion engine having a temperature sensing system according to the present invention.

A temperature sensing system 11, shown in FIG. 2, infers ECT from a measured CHT. The engine 12 includes a cylinder block 18 having a cylinder 20 formed therein and a piston 22 reciprocally housed within the cylinder 20. A cylinder head 24 is mounted to the cylinder block 18, with a cylinder head gasket 26 disposed therebetween, such that the cylinder head 24 closes the outer end of the cylinder 20, thereby defining a combustion chamber 28 between the top of the piston 22 and an insulation deck 30 of the cylinder head 24. A sparkplug 32 is fastened to the cylinder head 24 to communicate with the combustion chamber 28. A cooling system 34 of the engine 12 is generally provided by a coolant passage 36 formed in the cylinder head 24. A coolant 38 circulates in coolant passage 36 to cool the engine 12.

According to the present invention, a temperature sensor 42 *having a threaded portion, 40,* communicates with the insulation deck 30 in the cylinder head 24 adjacent the combustion chamber 28. Preferably, the temperature sensor 42 is a thermistor as is known in the art. The temperature sensor 42 senses the cylinder head 24 temperature and relays the information to an electronic engine controller (EEC) 44 having a keep alive memory (KAM) storage device 46.

Figure 3:
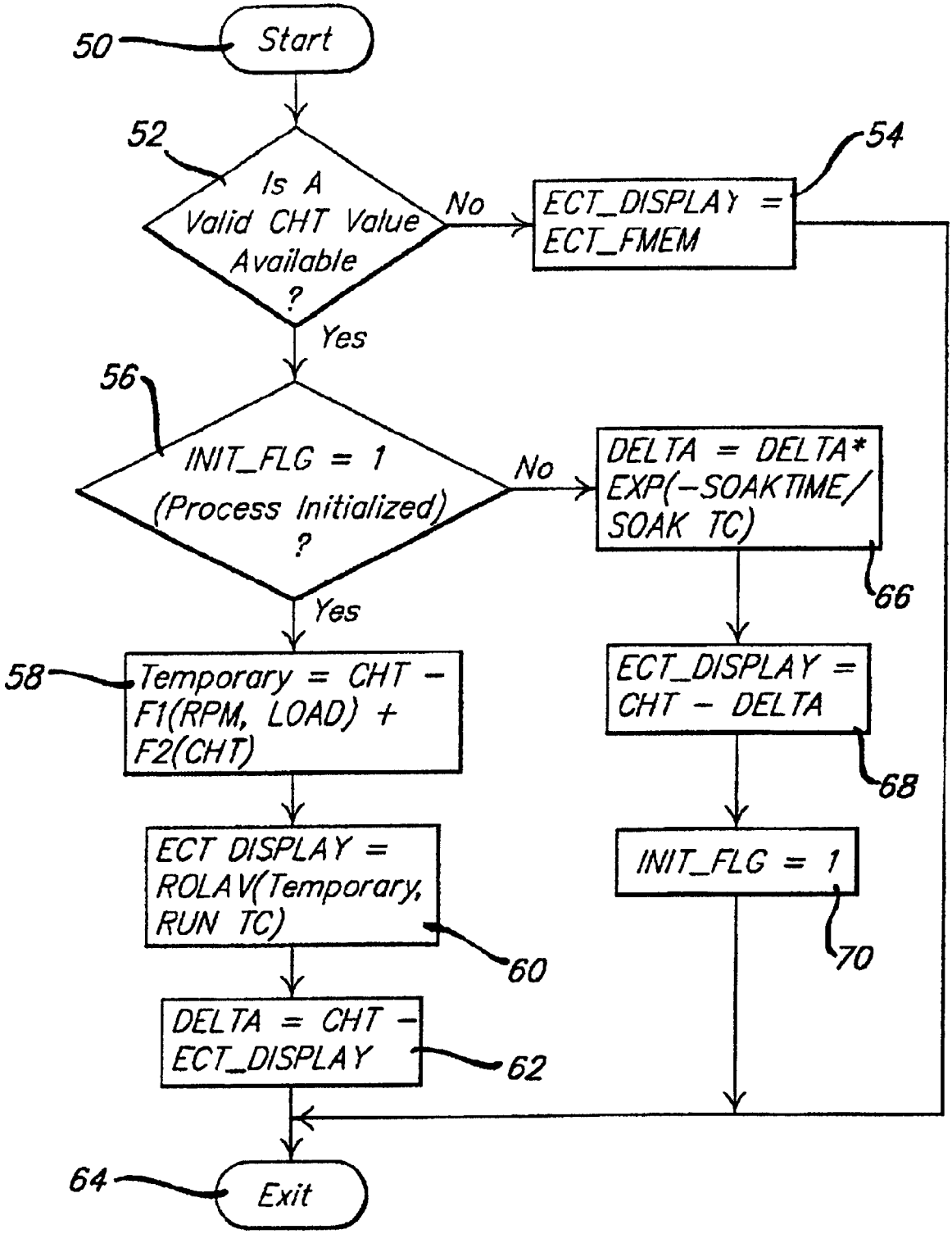
FIG. 3 is a flow chart showing a method for inferring ECT in CHT sensor equipped vehicles according to the present invention.

Referring now to FIG. 3, according to the present invention, a method of inferring ECT from a CHT sensor is described. At step 50, the process is initiated. At step 52, it is determined whether a CHT is available from the EEC. If not, then at step 54 the engine temperature signal generated and sent to the display 16 (ECT DISPLAY) is set equal to a failure mode value of ECT (ECT FMEM). Generally, the engine temperature signal generated and sent to the display 16 at step 54 equals the combustion chamber air charge temperature during a cold start, and ramps to a calibratible constant whose value is typical for a warm engine.

If a valid CHT is available, then at step 56, it is determined whether the initial pass through this process has been completed (INIT FLG). The initial pass completed is indicated by a 1 as discussed below.

If the initial pass was completed, then at step 58, a temporary ECT value is determine. This temporary value is equal to the CHT value minus a first function (F1(RPM, LOAD)) plus a second function (F2(CHT)). The first function is derived from a calibratible look up table showing the deviation of ECT from CHT as a function of revolutions per minute (RPM) and cylinder air charge temperature (LOAD). Both RPM and LOAD values may be derived from the EEC. The second function is to account for the difference between ECT and CHT increases for very high values of CHT.

At step 60, the engine temperature signal generated and sent to the display 16 (ECT DISPLAY) is set equal to a rolling average function (ROLAV) used to filter out noise. The rolling average function is determined as a function of the temporary ECT value and a calibratible time constant (RUN TC) and takes into consideration the fact that CHT heats faster than the engine coolant.

At step 62, the temperature difference (DELTA) is determined and stored. The DELTA is the difference between the CHT and the engine temperature signal generated. The DELTA is sent to the display 16 and is stored in KAM, so that the DELTA at power-down is available during the next power-up. At step 64, the process ends.

If the pass at step 56 was not completed, then the process flow moves to step 66, where DELTA is determined as a function of the last DELTA stored in KAM multiplied by an exponential decay function (EXP). The EXP is a function of the number of minutes the engine 12 has been powered down (SOAKTIME) divided by a calibratible time constant (SOAK TC), which determines the rate at which DELTA decays during a soak. This information is available from the EEC 44. The EXP is equal to 1 if SOAKTIME equals zero and decays to zero as SOAKTIME approaches infinity. At step 68, the engine temperature signal generated and sent to the display 16 is equal to the difference between the CHT and the DELTA from step 66. At step 70, INIT FLG is registered as 1 indicating that the initial pass has been completed. At step 64, the process ends.

The present invention is advantageous for a number of reasons. First, because ECT is calculated as a function of the vehicle operational state "false readings" are avoided. For example, "false readings" which may arise when CHT is running hotter than ECT, but still within an acceptable operational range. Further, filtering the calculated ECT prevents inaccurate display readings resulting from sudden changes in vehicle operational states. More specifically, because ECT is being inferred by CHT as a function of RPM and LOAD, anomalous readings for RPM and LOAD need to be taken out of the calculation as they tend to change faster than actual CHT and ECT. In other words, if ECT is being inferred at a time when there is a sudden spike in RPM, with the RPM then returning to normal running, without filtering, the ECT calculation would indicate being out of control limits when that is not actually the case. It is an important aspect of the invention, therefore, that not only is ECT inferred from CHT as a function of vehicle operational states, but also that the ECT sent to the display is filtered to eliminate noise resulting from the various operational states.

Various other modifications to the present invention will, no doubt, occur to those skilled in the art to which the present invention pertains. It is the following claims, including all equivalents, which define the scope of the present invention.

What is claimed is:

1. A method of inferring engine coolant temperature in cylinder head temperature sensor equipped vehicles comprising the steps of:

measuring the cylinder head temperature;

calculating the engine coolant temperature from the measured cylinder head temperature as a function of at least one vehicle operational state;

generating a signal for the calculated engine coolant temperature[; and sending the generated signal to a display].

2. A method according to claim 1, wherein the vehicle operational state [is] *includes* engine revolutions per minute.

3. A method according to claim 2, wherein the vehicle operational state [is] *includes* cylinder air charge temperature.

4. A method according to claim 1, wherein the vehicle operational states are both engine revolutions per minute and cylinder air charge temperature.

5. A method according to claim 1, further including the step of filtering the calculated engine coolant temperature so as to prevent inaccurate display readings resulting from sudden changes in vehicle operational states, the filter step performed prior to the step of generating a signal.

6. A method according to claim 5, further including the step of [recording] *determining* the difference between the measured cylinder head temperature and the filtered engine coolant temperature *and recording said difference*.

7. A method according to claim 6, further including the step of storing the recorded difference in keep alive memory.

8. A method according to claim 7, further including the steps of:

decaying the difference between the measured cylinder head temperature and the filtered engine coolant temperature as an exponential function of soak time upon vehicle startup;

generating an initial, startup signal by subtracting the measured cylinder head temperature from the last recorded difference stored in keep alive memory; and sending an initial, startup signal to the display.

9. A method of inferring engine coolant temperature in cylinder head temperature sensor equipped vehicles comprising the steps of:

measuring the cylinder head temperature;

calculating the engine coolant temperature from the measured cylinder head temperature as a function of engine revolutions per minute and cylinder air charge temperature;

generating a signal for the calculated engine coolant temperature; and sending the generated signal to a display.

10. A method according to claim 9, further including the step of filtering the calculated engine coolant temperature so as to prevent inaccurate display readings resulting from sudden changes in revolutions per minute and air charge temperature, the filtering step performed prior to the step of generating a signal.

11. A method according to claim 10, further including the step of [recording] *determining* the difference between the measured cylinder head temperature and the filtered engine coolant temperature *and recording said difference*.

12. A method according to claim 11, further including the step of storing the recorded difference in keep alive memory.

13. A method according to claim 12, further including the steps of:

decaying the difference between the measured cylinder head temperature and the filtered engine coolant temperature as an exponential function of soak time upon vehicle startup;

generating an initial, startup signal by subtracting the measured cylinder head temperature from the last recorded difference stored in keep alive memory; and sending an initial, startup signal to the display.

14. A system for inferring engine coolant temperature in cylinder head temperature sensor equipped vehicles comprising:

a cylinder head temperature sensor; and a controller for calculating the engine coolant temperature from the measured cylinder head temperature as a function of engine revolutions per minute and cylinder air charge temperature, wherein the controller generates a signal for the calculated engine coolant temperature and sends the generated signal to a display.

15. A system according to claim 14, wherein the controller further filters the calculated engine coolant temperature so as to prevent inaccurate display readings resulting from sudden changes in revolutions per minute and air charge temperature, the filtering performed prior to generation of the signal.

16. A system according to claim 15, wherein the controller further [records] *determines* the difference between the measured cylinder head temperature and the filtered engine coolant temperature *and records said difference*.

17. A system according to claim 16, wherein the controller further stores the recorded differences in keep alive memory.

18. A system according to claim 17, wherein the controller further:

decays the difference between the measured cylinder head temperature and the filtered engine coolant temperature as an exponential function of soak time if determined that the cylinder head temperature measurement was taken at vehicle startup;

generates an initial, startup signal by subtracting the measured cylinder head temperature from the last recorded difference stored in keep alive memory; and sends an initial, startup signal to the display.

*19. The method according to claim 1, further comprising the step of sending the generated signal to a display.*

*20. A method of operating a motor vehicle having an internal combustion engine, comprising:*

*measuring a cylinder head temperature;*

*inferring an engine coolant temperature from the measured cylinder head temperature; and*

*generating a signal for the inferred engine coolant temperature.*

*21. The method according to claim 20, further comprising sending the generated signal to a display.*

*22. The method according to claim 21, further including the step of filtering the inferred engine coolant temperature so as to prevent inaccurate display readings resulting from sudden changes in vehicle operational states, the filter step performed prior to the step of generating a signal.*

*23. The method according to claim 22, further including the step of determining the difference between the measured cylinder head temperature and the filtered engine coolant temperature and recording said difference.*

*24. A method according to claim 23, further including the step of storing the recorded difference in keep alive memory.*

*25. A method according to claim 24, further including the steps of:*

*decaying the difference between the measured cylinder head temperature and the filtered engine coolant temperature as an exponential function of soak time upon vehicle startup;*

*generating an initial, startup signal by subtracting the measured cylinder head temperature from the last recorded difference stored in keep alive memory; and*

*sending an initial, startup signal to the display.*

* * * * *